March 7, 1944.  A. G. BADE  2,343,840
VARIABLE SPEED TRANSMISSION
Filed June 12, 1941
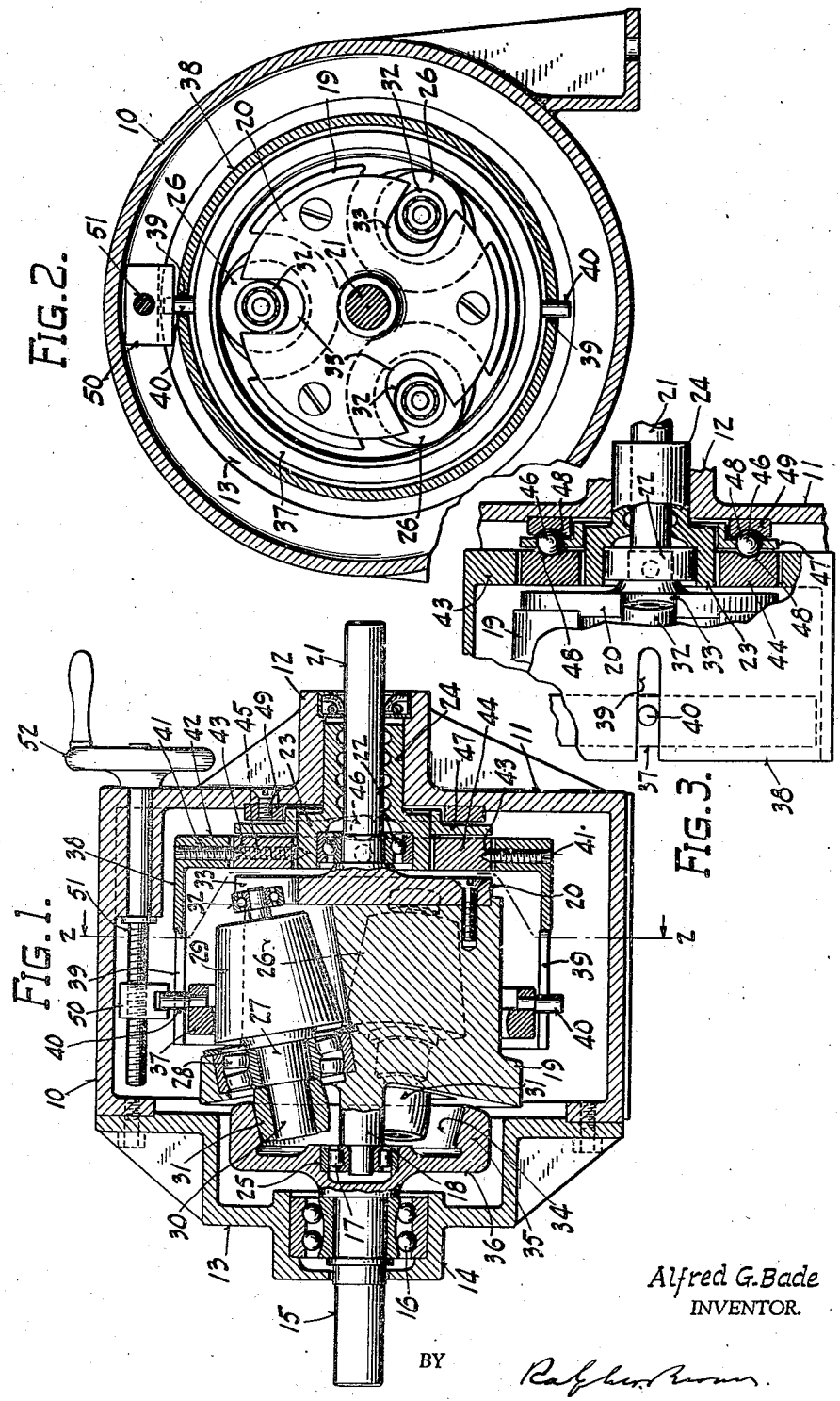
Alfred G. Bade
INVENTOR.
BY
ATTORNEY.

Patented Mar. 7, 1944

2,343,840

UNITED STATES PATENT OFFICE 2,343,840

VARIABLE SPEED TRANSMISSION

Alfred G. Bade, Wauwatosa, Wis., assignor to The Falk Corporation, Milwaukee, Wis., a corporation of Wisconsin Application June 12, 1941, Serial No. 397,711

7 Claims. (Cl. 74—231)

This invention relates to variable speed transmissions of the planetary friction type, such for instance as those disclosed in my prior Patent No. 2,239,983 and the prior patent to myself and Walter P. Schmitter, No. 2,203,637.

Each of the transmissions therein disclosed involves a plurality of tapered planet rollers in rolling contact with a control ring which is adjustable lengthwise of the rollers to vary their planetary action and thereby vary the speed ratio of the transmission. Such transmissions also usually involve some form of device for forcing the rollers against the control ring so as to establish normal pressures therebetween of sufficient magnitude to insure adequate traction. In the transmissions therein shown the torque is transmitted through a planetary system of toothed gears, including a planet pinion attached to each roller, which are difficult and costly to produce and which, under some conditions, are inclined to be noisy.

An object of the present invention is to avoid the use of toothed gearing in a transmission of this type without impairing the load transmitting capacity thereof. This I have accomplished by making use of a planetary system of friction gears so combined with other parts of the transmission as to provide and maintain high normal pressures between the friction gears.

A more specific object is to provide a variable speed transmission of this type in which the pressure reactions between the rollers and control ring are utilized to maintain relatively high normal pressures between the friction elements of the planetary gearing and vice versa.

Another specific object is to provide a variable speed transmission of this type in which the same means which forces the rollers into pressure contact with the control ring also serves to develop pressure contact between the friction elements of the planetary gearing.

Other objects and advantages will appear from the following description of a variable speed transmission constructed in accordance with the present invention.

In the accompanying drawing:

Figure 1 is an axial sectional view of a variable speed transmission embodying the present invention.

Fig. 2 is a transverse sectional view taken substantially along the line 2—2 of Fig. 1.

Fig. 3 is a fragmentary horizontal sectional view taken substantially in the plane of the drive shaft, with parts shown in elevation.

The variable speed transmission selected for illustration is shown enclosed in a substantially cylindrical housing 10, having an integral rear end wall 11 supporting a central hub 12, the housing being closed at its front end by an appropriate end head 13 having a central hub 14.

The hub 14 provides a rigid support for a driven shaft 15 journalled in appropriate bearings 16 therein. The shaft 15 is hollowed out at its inner end to form a seat for a roller bearing 17 in which is journalled a stub shaft 18 projecting from and supporting one end of a rotor 19 to be later described. The other end of the rotor is supported by a disk 20 attached thereto and having supporting shaft 21 journalled in a bearing 22 fixed in a cage 23. The cage 23 has a sleeve extension 24 surrounding the shaft 21 and slidably fitted in the hub 12. Shaft 21 is the drive shaft.

The rollers of the bearing 17 are free to shift axially within their outer bearing race 25, and the rotor 19, drive shaft 21, and cage 23 are also free to shift axially therewith, as a unit, for purposes which will later appear.

The rotor 19 carries a plurality of inclined planet rollers 26, preferably three in number although two or more may be employed. Each roller comprises an intermediate cylindrical section 27 journalled in a spherical bearing 28 fixed in the rotor 19, a tapered conical section 29 disposed at one side of the bearing, and an extended portion 30 disposed at the opposite side of the bearing and carrying a friction head or gear 31 fixed thereto. Each roller is free to rock in its bearing 28, but the axis of the roller is maintained within a radial plane of the rotor 19 by a bearing 32 carried by the free end of the conical section 29 and engaged in a radial slot 33 formed in the disk 20.

The friction gear 31 of each roller engages the conical face 34 of a ring 35 carried by a disk 36 on the driven shaft 15, and the gear 31 is preferably slightly crowned so as to reduce the area of contact with face 34. The inclination of the face 34 is such that, when the rotor 19 and rollers are forced toward the disk 36, the face 34 reacts on the friction gears 31 to force them inwardly and coacts with the spherical bearings 28, as fulcrums, to force the tapered sections 29 of the rollers outwardly against an encircling control ring 37.

The control ring 37 is supported by the several rollers 26 and is centered thereby. It is retained against rotation by means which reacts to urge the rotor 19 axially toward the disk 36. In the device shown, the means for that purpose includes a cylindrical shell 38 surrounding and spaced from the ring 37 and bearing a pair of longitudinal guide slots 39 therein positioned to receive diametrically disposed pins 40 which project radially from the ring 37. The shell 38 is swingably supported at one end by a pair of vertically aligned pivot pins 41 fixed in an end collar 42 of the shell and engaged in appropriate sockets 43 formed in an inner carrier ring 44. The shell 38 is thus free to swing horizontally so as to provide horizontal freedom of movement for the control ring 37, and since the pins 40 are free to move vertically in their guide slots 39, thereby providing vertical freedom of movement of the control ring 37, the control ring is free to center itself with respect to the group of rollers which it encircles and to thereby equalize the contact pressures between it and the several rollers.

The carrier ring 44 is also mounted upon a pair of aligned diametrically disposed pivot pins 45 fixed therein and engaged in suitable sockets in the cage 23, in a manner similar to the pivot pins 41. One of the pins 45 is shown in dotted lines in Fig. 1. In order to avoid conflict with the sockets 43 in the ring 44, the pins 45 are preferably slightly offset from the pins 41 in the collar 42 so that their common axis is only slightly inclined from the vertical axis of the pins 41. The carrier ring 44 is thus flexibly attached to the cage 23 and to the shell 38 in such manner as to prevent relative rotation or axial movement therebetween.

The carrier ring 44, and consequently the shell 38 and control ring 37, are restrained against rotation by a camming device of a well known type which reacts to force the ring 44, cage 23, and rotor 19 toward the left (Fig. 1). In this instance the camming device shown comprises two balls 46 in an appropriate retainer ring 47, each being confined between a pair of opposed cam grooves 48 formed in the opposed faces of the ring 44 and a stationary ring 49 anchored to the end wall 11 of the housing. The arrangement is such that, as the ring 44 is urged to rotate in either direction under the torque reaction transmitted from the control ring 37 through the shell 38, the cam surfaces of the grooves 48 react on the balls in a well known manner to force the ring 44, and consequently the cage 23 and rotor 19, axially away from the housing and wall 11, and this movement or axial thrust is resisted by the contact pressures of the rollers against the driven ring 35 and the control ring 37. It will thus be understood that the camming device resists rotation of the control ring 37 and reacts under the torque load thus imposed upon it to increase the contact pressures between the several friction gears 31 and ring 35 and between the conical sections 29 of the rollers and the control ring 37.

The balls 46 of the camming device are preferably disposed in a horizontal plane at opposite sides of the shaft 21, and it will be noted that since the ring 44 is otherwise free to swing about the common axis of the substantially upright pivot pins 45, the thrusts of the balls 46 against the ring 44 are substantially equalized.

It will of course be understood that the rotor 19 is driven by the shaft 21 and that the several rollers 26 revolve therewith, with the conical sections 29 thereof in rolling contact with the control ring 37 and the friction gears 31 thereof in rolling contact with the driven ring 35. By reason of their frictional engagement with the control ring, the several rollers of course revolve about their individual axes in directions opposite to the direction of their rotary travel with the rotor 19, so that the rate and direction of rotation of the driven ring 35 is of course dependent upon the net result of those two motions. The rate of rotation of the several rollers about their individual axes may be varied of course, to regulate the rate and direction of rotation of the driven ring 35, by shifting the control ring 37 along the tapered sections of the rollers, since the effective radius of each of the rollers is thereby varied.

In this instance the control ring 37 is shifted along the rollers by a nut 50 transversely slotted to receive the projecting end of one of the pins 40, the nut being threaded upon a screw 51 journalled and longitudinally fixed in the roof of the housing 10 and equipped with a hand wheel 52 by which it may be manipulated.

Various changes may be made in the embodiment of the invention hereinabove specifically described without departing from or sacrificing the advantages of the invention as defined in the appended claims.

I claim:

1. In a variable speed transmission the combination of a roller revolvable in planetary fashion about a central axis, three elements coacting with said roller at longitudinally spaced points thereon to position the same relative to said axis, two of said elements comprising spaced torque sustaining rings in rolling engagement with said roller, said rings being disposed coaxially of said axis and one of said rings being rotatable relative to the other, the third of said elements providing a fulcrum support for said roller, means for adjusting one of said elements to induce pressure contact between said roller and rings, and means for effecting relative adjustment between said roller and one of said rings to vary the rate of relative rotation between said rings.

2. In a variable speed transmission the combination of a roller revolvable in planetary fashion about a central axis, three elements coacting with said roller at longitudinally spaced points thereon to position said roller relative to said axis, two of said elements comprising spaced torque sustaining rings in rolling engagement with said roller, said rings being disposed coaxially of said axis and one of said rings being rotatable relative to the other, the third of said elements providing a fulcrum support for said roller, and means for adjusting one of said elements to induce pressure contact between said roller and rings.

3. In a variable speed transmission the combination of a roller revolvable in planetary fashion about a central axis, and three elements coacting with said roller at longitudinally spaced points thereon to position said roller relative to said axis, two of said elements comprising spaced torque sustaining rings in rolling engagement with said rollers, one of said rings being rotatable relative to the other, the third of said elements providing fulcrum supports for said rollers, and means for adjusting one of said elements to induce pressure contact between said rollers and rings.

4. In a variable speed transmission the combination of a plurality of rollers revolvable in planetary fashion about a central axis, three elements coacting with all of said rollers at longitudinally spaced points thereon to position said rollers relative to said axis, two of said elements comprising spaced torque sustaining rings in rolling engagement with said rollers, one of said rings being rotatable relative to the other, the third of said elements providing fulcrum supports for said rollers, and means for adjusting one of said elements to induce pressure contact between said rollers and rings.

5. In a variable speed transmission the combination of a plurality of rollers revolvable in planetary fashion about a central axis, and three elements coacting with all of said rollers at longitudinally spaced points thereon to position said rollers relative to said axis, two of said elements comprising torque sustaining rings in rolling engagement with said rollers, one of said rings being rotatable relative to the other, the third of said elements providing fulcrum supports for said rollers, one of said elements being moveable to induce pressure contact between said rollers and rings, and another of said elements being moveable to vary the rate of relative rotation between said rings.

6. In a variable speed transmission the combination of a non-rotating ring, a torque transmitting rotating ring coaxial therewith, a rotor disposed coaxially of said rings, a plurality of planet rollers each having a tapered section in rolling engagement with said non-rotating ring and another section in rolling engagement with said rotating ring, swivel bearings in said rotor in which said rollers are respectively journalled, means for effecting axial adjustment of said rotor to induce pressure contact between said rollers and ring, and means for effecting adjustment of said non-rotating ring along the tapered sections of said rollers to vary the rate of rotation of said rotating ring.

7. In a variable speed transmission the combination of a rotor, swivel bearings carried thereby, a plurality of planet rollers each journalled intermediate its ends in one of said bearings, a torque transmitting ring, a control ring, each of said rollers having one end portion in rolling engagement with one of said rings and the other end portion in rolling engagement with the other of said rings, means for effecting relative axial adjustment between said rotor and said rotating ring to induce pressure contact between said rollers and rings, and means for effecting relative axial adjustment between said rotor and said non-rotating ring to thereby vary the rate of rotation of said rotating ring.

ALFRED G. BADE.